(12) United States Patent
Beele

(10) Patent No.: US 6,359,224 B1
(45) Date of Patent: Mar. 19, 2002

(54) BUSHING

(75) Inventor: Johannes Alfred Beele, Aalten (NL)

(73) Assignee: Beele Engineering B.V., Aalten (NL)

( * ) Notice: Subject to any disclaimer, the term of this patent is extended or adjusted under 35 U.S.C. 154(b) by 0 days.

(21) Appl. No.: 09/656,368

(22) Filed: Sep. 6, 2000

Related U.S. Application Data

(63) Continuation of application No. PCT/NL99/00084, filed on Feb. 17, 1999.

(30) Foreign Application Priority Data

Mar. 6, 1998 (NL) .............................................. 1008522

(51) Int. Cl.[7] .................................................. H02G 3/18
(52) U.S. Cl. .................. 174/65 G; 174/65 R; 174/151; 16/2.1
(58) Field of Search ........................ 174/65 R, 152 R, 174/65 G, 50.56, 135, 106 R, 102 R, 153 G, 151; 16/2.1, 2.2; 248/56; 339/103 B

(56) References Cited

U.S. PATENT DOCUMENTS

| | | | | |
|---|---|---|---|---|
| 3,322,890 A | * | 5/1967 | Kennedy et al. | ......... 174/152 R |
| 3,844,030 A | * | 10/1974 | Wilkinson | ............... 174/50.56 |
| 3,860,787 A | | 1/1975 | Strobach | |
| 4,386,817 A | * | 6/1983 | Benker et al. | .......... 339/103 B |
| 4,670,625 A | * | 6/1987 | Wood et al. | ............ 174/152 R |
| 4,703,134 A | * | 10/1987 | Uematsu | .................. 174/106 R |
| 4,922,573 A | * | 5/1990 | Miller et al. | ............ 174/152 R |
| 4,924,038 A | * | 5/1990 | Klosin et al. | ................ 174/135 |
| 5,170,008 A | * | 12/1992 | Evans et al. | ............... 174/65 G |
| 5,300,733 A | * | 4/1994 | Uematsu | ................ 174/102 R |
| 5,397,855 A | * | 3/1995 | Ferlier | .......................... 174/36 |
| 5,488,766 A | * | 2/1996 | Gerry et al. | ............. 174/135 R |
| 5,540,450 A | * | 7/1996 | Hayashi et al. | ........... 174/65 G |
| 5,902,956 A | * | 5/1999 | Spies et al. | ............. 174/35 GC |
| 6,119,305 A | * | 9/2000 | Loveall et al. | ............. 174/65 G |

FOREIGN PATENT DOCUMENTS

| | | |
|---|---|---|
| EP | 0058876 A | 9/1982 |
| GB | 2181607 A | 4/1987 |

* cited by examiner

Primary Examiner—Anthony Dinkins
Assistant Examiner—Angel R. Estrada
(74) Attorney, Agent, or Firm—Jones, Day, Reavis & Pogue

(57) ABSTRACT

A bushing for leading at least one cable through an opening in a wall or the like while providing protection against electromagnetic overtension and/or interference, characterized in that said bushing comprises a sealing collar of an elastic material, which can be sealingly fitted in the opening in the wall, and which is provided with at least one through channel for sealingly leading said cable therethrough, which sealing collar is electrically conductive and which is in contact with an electrically conductive cable shield of the cable in the operative condition of the bushing.

11 Claims, 2 Drawing Sheets

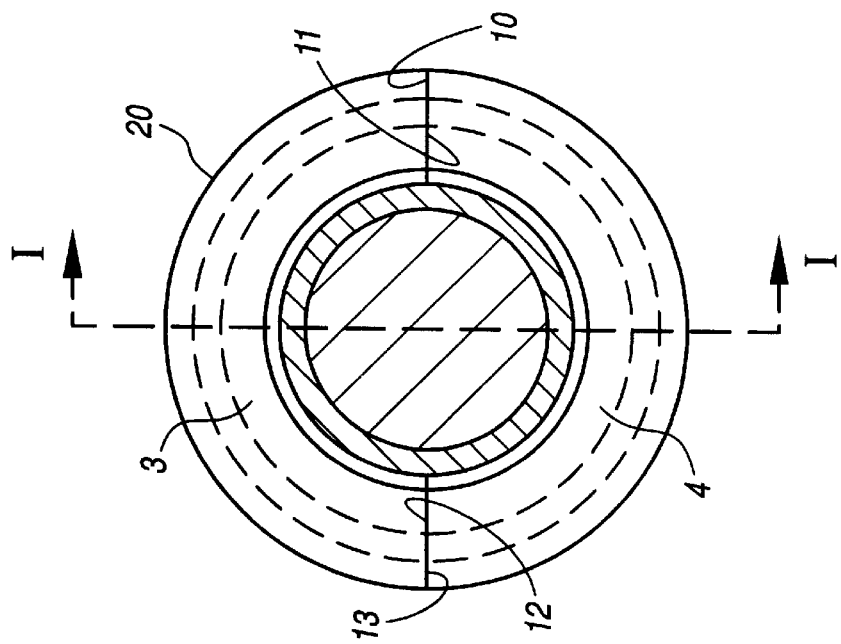
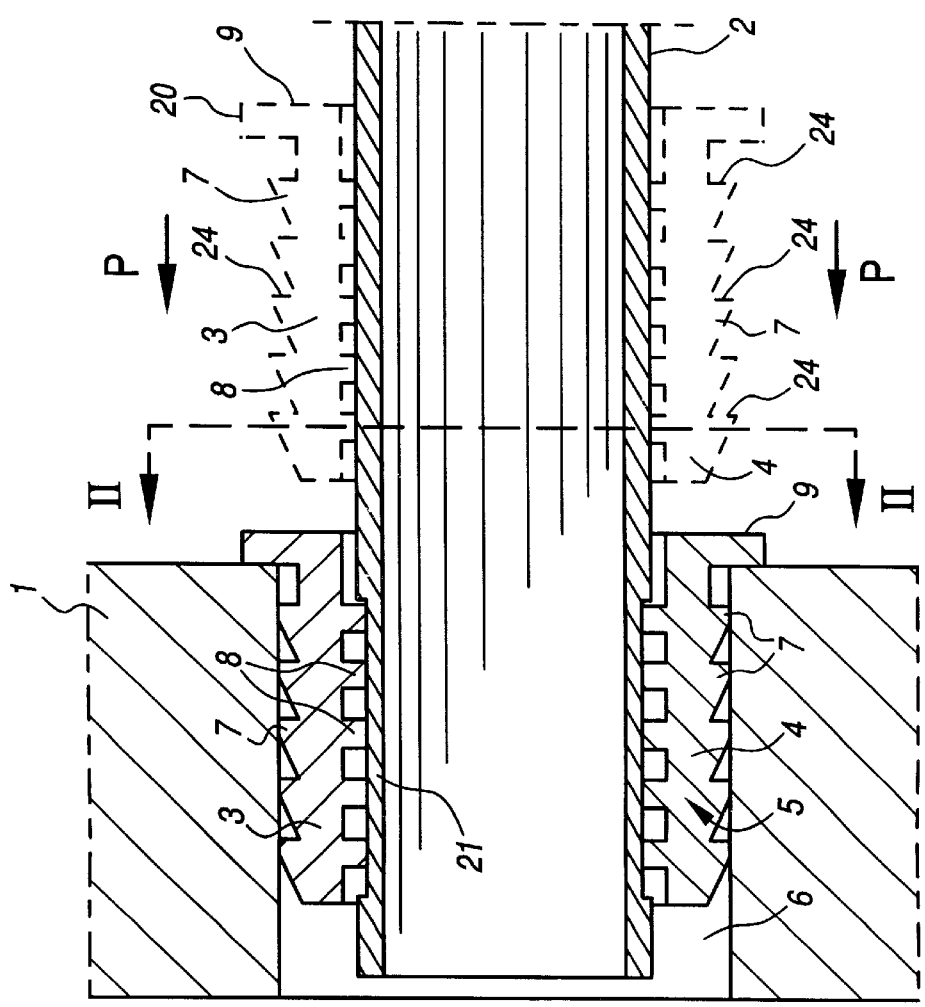

BUSHING

This is a continuation of International Application No. PCT/NL99/00084, filed Feb. 17, 1999, which claims priority of Netherlands Patent Application No. 1008522, filed Mar. 6, 1998.

BACKGROUND OF THE INVENTION

The invention relates to a bushing for leading at least one cable through an opening in a wall or the like whilst providing protection against electromagnetic overtension and/or interference.

Such a bushing is known from Dutch patent application NL 173.226. This known bushing comprises an electrically conductive wall bushing and a protective circuit against overtension incorporated therein, which comprises at least two conduction components for each supply and return cable core to be connected from outside, and which terminates in terminal connecting points for said cable cores. A cross partition connected to said wall bushing divides said components into two departments, wherein all components of the protective circuit and the terminal contact points of the supply and return cable cores are placed on an electrically insulating circuit board. Said circuit board is fitted in the cavity of said wall bushing as a prefabricated insert unit, and fixed thereto together with said cross partition.

One drawback of the known bushing is that it is not chemically resistant, fire resistant, gastight and watertight. Another drawback of the known bushing is the fact that its construction is complicated and expensive. Furthermore, this known bushing hardly offers a possibility to inspect the protective circuit in the mounted condition of the bushing.

SUMMARY OF THE INVENTION

The objective of the invention is to provide a bushing comprising a protection against electromagnetic overtension and/or interference, which is simple, inexpensive, chemically resistant, fire resistant, gastight and watertight, and whose protective device can easily be inspected in mounted condition.

A bushing of the kind referred to in the introduction is according to the invention characterized in that said bushing comprises a sealing collar of an elastic material, which can be sealingly fitted in the opening in the wall, and which is provided with at least one through channel for sealingly leading said cable therethrough, which sealing collar is electrically conductive and which is in contact with an electrically conductive cable shield of the cable in the operative condition of the bushing. The term electrically conductive sealing collar which is used in this framework is understood to mean that the material of the sealing collar is at least substantially electrically conductive, in particular in that additives have been added to the sealing material (preferably a resilient material such as rubber). Electrical conductivity has been realized by chemical means, therefore. Electrical installations and machines, wherein generally highly sensitive components are used for control and registration purposes, are highly susceptible to interference caused by various external electromagnetic fields and impulses. Said external electromagnetic fields and impulses may for example be generated by radar installations, thunderstorms, nuclear explosions and by electric/electronic equipment. In practice, steel constructions functioning as a Faraday cage are often placed round a space intended for electronic equipment in order to minimize such interference. Nevertheless, there is still a chance that electric cables, which are led into such a shielded space, will conduct undesirable electromagnetic fields and impulses into said electronic equipment. As a rule, said conduction will take place via the electrically conductive shielding ("braiding") of the bushed cables in question. According to the invention, said external, undesirable electromagnetic fields and impulses will flow to earth along the electrically conductive shielding of a bushed cable, via the electrically conductive sealing collar. Thus, the occurrence of said interference in electronic equipment is prevented in a simple manner. Furthermore it has become apparent that the present bushing is also quite suitable for leading a cable through a steel deck or bulkhead of a ship.

It is noted that within the framework of the invention, the term "cable" as used herein is understood to include an electrically conductive conduit, tube, pipe or the like, for example a metallic tube or conduit, with which the present sealing collar is in electrically conductive contact in the operative condition.

In one embodiment of a bushing according to the invention, the sealing collar abuts at least partially against the electrically conductive cable shield of the cable in the operative condition of the bushing. This makes it possible to fit the sealing collar easily and firmly round the electrically conductive cable shield.

In another embodiment of a bushing according to the invention, said sealing collar is made of (massive) rubber, to which carbon particles in the form of soot ("carbon black") have been added. Preferably, said rubber is EPDM rubber, with the carbon particles in particular having a concave, dish-like shape, preferably being of the type "Ketjenblack" EC 300J or 600JD™. These types of soot, which are known under the trade name "Ketjenblack", have a unique morphology in comparison with conventional types of soot, which makes them uniquely suitable for the present electrically conductive application. The letters EPDM stand for Ethylene/Propylene/Diene/Monomer.

In another embodiment of a bushing according to the invention, said sealing collar is provided with circular internal and external ribs, which external ribs have a diameter which is larger than the inside diameter of the opening in the wall, and wherein the inside diameter of the internal ribs is at least at the most substantially the same as the outside diameter of the cable. Thus, a reliable seal is realized between the sealing collar and the wall opening on the one hand and between the sealing collar and the cable on the other hand.

In another embodiment of a bushing according to the invention, the rear flanks, seen in the direction of insertion, of the outer serrated ribs extend in radial direction, and the inner ribs are provided in pairs in the radial area of the outwardly extending tops of the outer serrated ribs. Preferably, the inner ribs, seen in the direction of an axial longitudinal section, are trapezoidal. Thus, an optimum sealing effect is realized, wherein the serrated ribs are slightly compressed against the wall opening.

In another embodiment of a bushing according to the invention, the sealing collar is made in one piece.

In another embodiment of a bushing according to the invention, the sealing collar comprises two shell parts, whose abutting boundary surfaces extend at least substantially in axial direction. In the operative condition, a pressure is thereby generated on the axial boundary surfaces, such that a reliable seal is formed between said two boundary surfaces.

The invention furthermore relates to a method for manufacturing a bushing according to the invention, wherein said sealing collar is made of an electrically conductive rubber by incorporating concave, dish-like carbon particles into the rubber by means of a vulcanizing process. The rubber is in particular EPDM rubber, whilst the carbon particles are preferably of the type "Ketjenblack" EC 300J or 600JD™.

BRIEF DESCRIPTION OF THE DRAWINGS

The invention will be explained in more detail hereafter with reference to figures illustrated in a drawing of a preferred embodiment of the present invention, wherein:

FIG. 1 is a schematic front view along line I—I in FIG. 2 of a cable which is sealingly led through an opening in a wall by means of a sealing collar according to the invention, the present bushing;

FIG. 2 is a view along line II—II in FIG. 1; and

DETAILED DESCRIPTION

Figure 3:
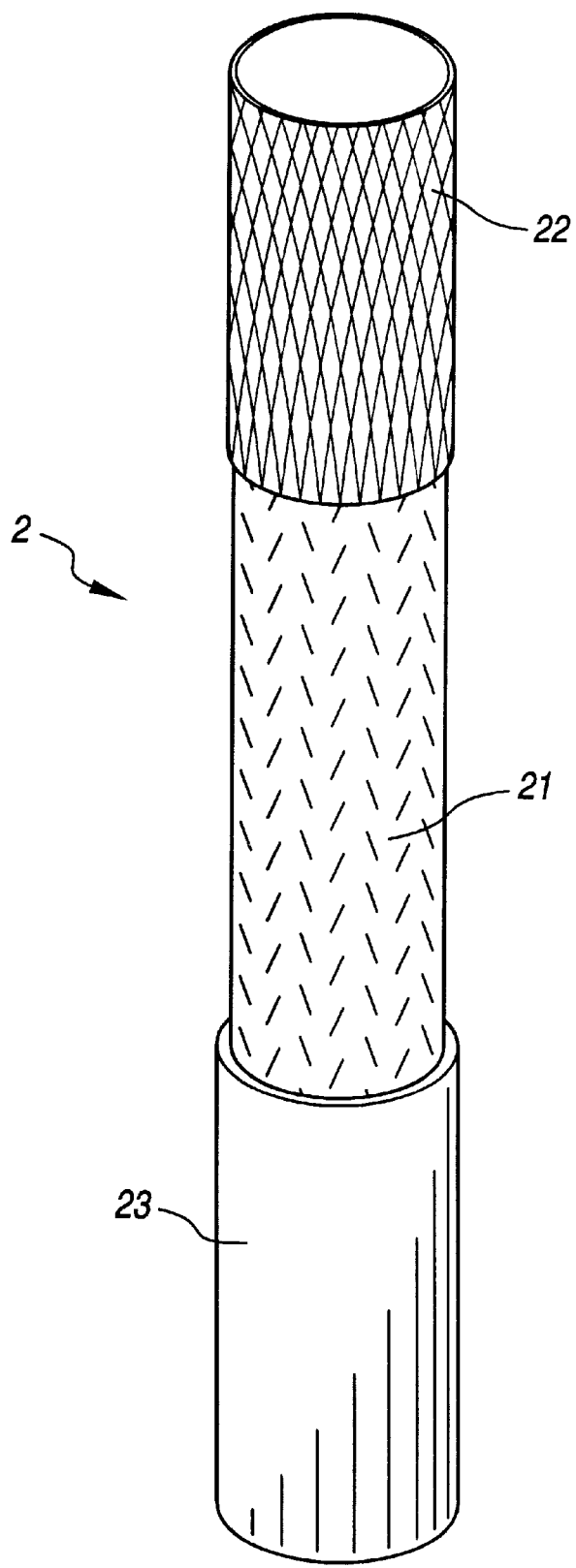
FIG. 3 shows the cable of FIG. 1 separately in perspective view.

FIG. 1 shows a wall in which an opening is present, though which a cable 2 is led. The sealing of the wall opening and the cable with a sealing collar according to the invention takes place as follows: a collar 5 consisting of two halves 3 and 4, which may be made of a hard resilient rubber material, is placed round cable 2 in surrounding relationship with respect thereto, as is shown in dotted lines in FIG. 1, and is subsequently inserted into the opening between walls 1 and cable 2 in the directed indicated by arrows p. The collar halves are formed with ridges 7 having a right-angled, triangular cross-section and with trapezoidal ridges on the inside. Collar 5 is now driven into opening 6, for example by tapping on front 9 of flange 20 in several places on the circumference thereof. Ridges 7 are compressed by wall 1 thereby, as a result of which the respective ridges 8 opposite ridges 7 attempt to reduce their diameter and press forcefully and sealingly down on the outside of cable 2. The compressive forces thus produced in the rubber also press the boundary surfaces 10 and 11, 12 and 13 sealingly together. The seal is now gastight, due to the pressures being produced, and will remain reliably in position as a result of the clamping action of the rubber. The contact surfaces of the collar and of the wall/cable may be moistened in situ with water, or with another suitable lubricant, so that the fitting of the bushing can take place more efficiently.

As is shown in FIG. 1, sealing collar 5 abuts against the electrically conductive cable shield 21 ("braiding") of cable 1. To this end, cable 2 has been stripped in situ of its metal shield and of its electrically insulating shield. Sealing collar 5 is electrically conductive, due to the incorporation of concave, dish-like carbon particles of the type "Ketjenblack" EC 300J or 600JD™ therein by means of a vulcanizing process, as a result of which external, undesirable electromagnetic fields and impulses flow to earth along the electrically conductive shield of the bushed cable 2, via the electrically conductive sealing collar 5.

FIG. 3 is a perspective view of cable 2 comprising "braiding" 21, an electrically insulating shield 22, as well as a metal shield 23.

What is claimed is:

1. A bushing for leading at least one cable through an opening in a wall while providing protection against electromagnetic overtension and/or interference, wherein said bushing comprises a sealing collar of an elastic material, which can be sealingly fitted in the opening in the wall, and which is provided with at least one through channel for sealingly leading said cable therethrough, which sealing collar is made of an electrically conductive material formed by adding carbon particles to a resilient sealing material, and which is in contact with an electrically conductive cable shield of the cable in the operative condition of the bushing, wherein said sealing collar comprises two shell parts whose abutting boundary surfaces extend at least substantially in an axial direction.

2. A bushing according to claim 1, wherein said sealing collar abuts at least partially against the electrically conductive cable shield of the cable in the operative condition of the bushing.

3. A bushing according to claim 1, wherein said sealing collar is made of rubber, to which carbon particles in the form of carbon black have been added.

4. A bushing according to claim 3, wherein said rubber is EPDM rubber.

5. A bushing according to claim 1, wherein said sealing collar is provided with circular internal and external ribs, which external ribs have a diameter which is larger than the inside diameter of the opening in the wall, and wherein the inside diameter of the internal ribs is at least at the most substantially the equal to the outside diameter of the cable.

6. A bushing according to claim 1, wherein said sealing collar is made in one piece.

7. A bushing for leading at least one cable through an opening in a wall while providing protection against electromagnetic overtension and/or interference, wherein said bushing comprises a sealing collar of an elastic material which can be sealingly fitted in the opening in the wall, and which is provided with at least one through channel for sealingly leading said cable therethrough, which sealing collar is made of an electrically conductive material formed by adding carbon particles to a resilient sealing material, and which is in contact with an electrically conductive cable shield of the cable in the operative condition of the bushing, wherein rear flanks, seen in the direction of insertion, of outer serrated ribs of the sealing collar extend in a radial direction, and inner ribs are provided in pairs in the radial area of outwardly extending tops of the outer serrated ribs.

8. A bushing according to claim 7, wherein the inner ribs, seen in the direction of an axial longitudinal section, are trapezoidal.

9. A bushing for leading at least one cable through an opening in a wall while providing protection against electromagnetic overtension and/or interference, wherein said bushing comprises a sealing collar of an elastic material, which can be sealingly fitted in the opening in the wall, and which is provided with at least one through channel for sealingly leading said cable therethrough, and which sealing collar is in contact with an electrically conductive cable shield of the cable in the operative condition of the bushing, wherein the sealing collar is made of rubber, to which carbon particles in the form of carbon black have been added, wherein said carbon particles have a concave, dish-like shape.

10. A method for manufacturing a bushing, wherein a sealing collar is made of an electrically conductive rubber by incorporating concave, dish-like carbon particles into the rubber by means of a vulcanizing process.

11. A method according to claim 10, wherein said rubber is in particular EPDM rubber.

* * * * *